(12) United States Patent
Kim et al.

(10) Patent No.: US 7,215,653 B2
(45) Date of Patent: May 8, 2007

(54) CONTROLLING DATA TRANSMISSION RATE ON THE REVERSE LINK FOR EACH MOBILE STATION IN A DEDICATED MANNER

(75) Inventors: Ki Jun Kim, Seoul (KR); Young Cho Kim, Seoul (KR); Young Jo Lee, Kunpo (KR); Jong Hoe An, Anyang (KR); Young Woo Yun, Seoul (KR); Young Jun Kim, Anyang (KR)

(73) Assignee: LG Electronics Inc., Seoul (KR)

( * ) Notice: Subject to any disclaimer, the term of this patent is extended or adjusted under 35 U.S.C. 154(b) by 962 days.

(21) Appl. No.: 10/071,243

(22) Filed: Feb. 11, 2002

(65) Prior Publication Data
US 2002/0141349 A1 Oct. 3, 2002

(30) Foreign Application Priority Data

| Feb. 12, 2001 | (KR) | 10-2001-0006839 |
| Jul. 10, 2001 | (KR) | 10-2001-0041363 |
| Sep. 18, 2001 | (KR) | 10-2001-0057600 |

(51) Int. Cl.
*H04Q 7/00* (2006.01)

(52) U.S. Cl. .................. 370/329; 370/332; 455/68; 455/69

(58) Field of Classification Search .............. None
See application file for complete search history.

(56) References Cited

U.S. PATENT DOCUMENTS

| 5,603,096 A | * | 2/1997 | Gilhousen et al. | 455/69 |
| 6,069,883 A | * | 5/2000 | Ejzak et al. | 370/335 |
| 6,389,034 B1 | * | 5/2002 | Guo et al. | 370/441 |
| 6,411,799 B1 | * | 6/2002 | Padovani | 455/69 |
| 6,741,862 B2 | * | 5/2004 | Chung et al. | 455/452.1 |
| 6,996,127 B2 | * | 2/2006 | Rezaiifar et al. | 370/468 |

FOREIGN PATENT DOCUMENTS

| EP | 0 767 548 A2 | | 4/1997 |
| EP | 1 003 302 A2 | | 5/2000 |
| EP | 1 067 729 A2 | | 1/2001 |
| EP | 1067729 | * | 1/2001 |
| GB | 2269296 A | * | 2/1994 |
| WO | WO 98/24199 | | 6/1998 |
| WO | WO 00/14900 | * | 3/2000 |

* cited by examiner

*Primary Examiner*—Huy D. Vu
*Assistant Examiner*—Robert W. Wilson
(74) *Attorney, Agent, or Firm*—Fleshner & Kim, LLP

(57) ABSTRACT

The data transmission rate on the reverse link in a mobile communications system is controlled by determining an interference level at a base station due to signals from all mobile stations served by the base station, and determining a transmission energy level required for each mobile station. The interference level is compared with the transmission energy level to obtain a comparison result for each mobile station, and each mobile adjusts its data transmission rate based upon the comparison result, which is sent via a common channel on a forward link to each mobile station in a dedicated manner. Thereafter, packet data is transmitted on the reverse link in accordance with the adjusting so that data throughput can be maximized.

40 Claims, 8 Drawing Sheets

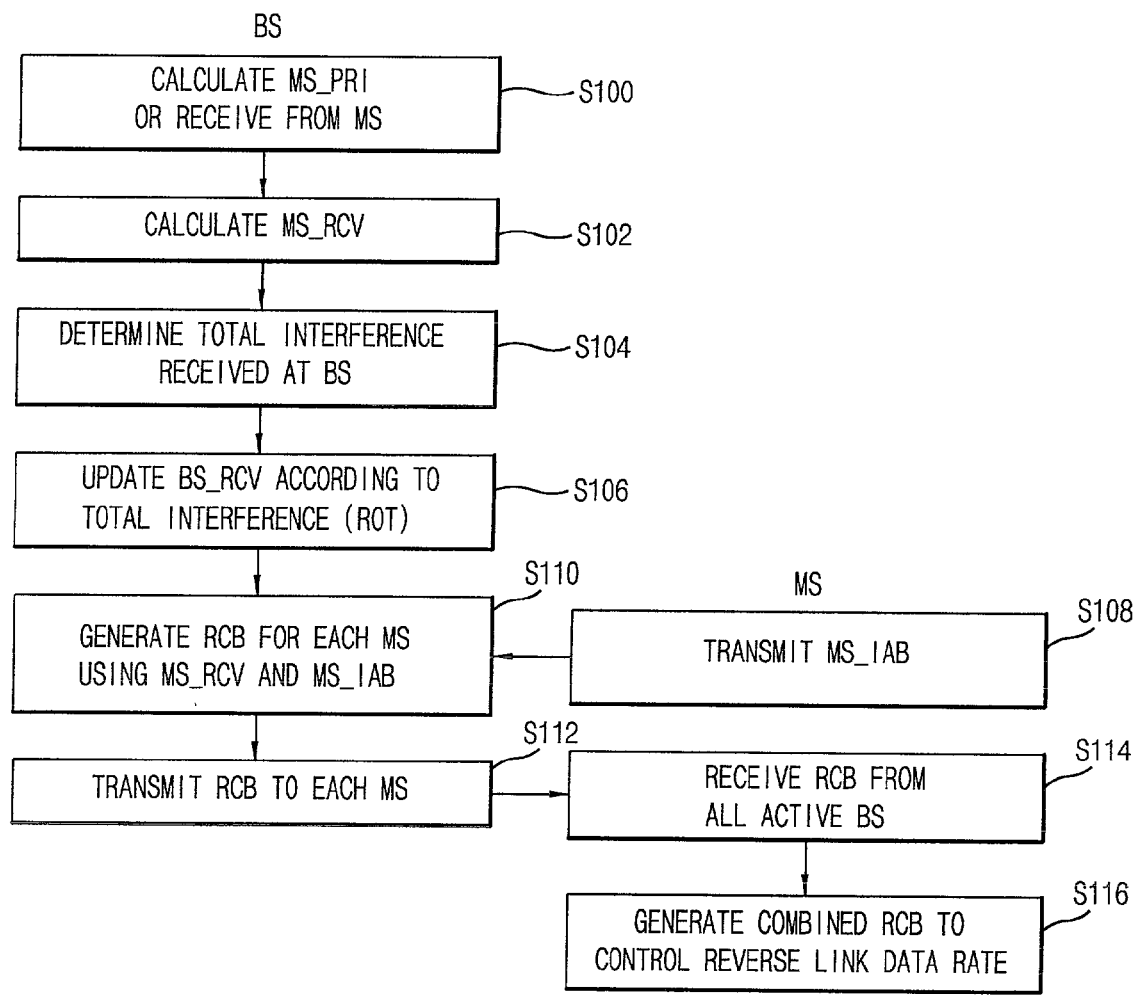

CONTROLLING DATA TRANSMISSION RATE ON THE REVERSE LINK FOR EACH MOBILE STATION IN A DEDICATED MANNER

FIELD OF THE INVENTION

The present invention generally relates to mobile (or wireless) communications, and in particular, to controlling data transmission (transfer) rates between a base station and mobile stations served by the base station so that data throughput is advantageously increased.

BACKGROUND OF THE INVENTION

Mobile communications involve, among various processing procedures, signal transmissions and handling of data traffic between an access network (AN) and an access terminal (AT). An access network (AN) comprises many elements, one of which being a base station, as known by those skilled in the art. An access terminal (AT) can be in many forms, including a mobile station (e.g., a mobile phone), a mobile terminal (e.g., a laptop computer), and other devices (e.g., a personal digital assistant: PDA) having the combined functionality of both a mobile station and a mobile terminal, or having other terminal capabilities. Hereinafter, an access terminal (AT) will be referred to as a "mobile" for the sake of brevity.

In a conventional mobile communications system, a plurality of mobiles (e.g., cellular phones, portable computers, etc.) are served by a network of base stations, which serve to allow the mobile stations to communicate with other components in the communications system. Various types of mobile communications systems are known, including Code Division Multiple Access (CDMA), time division multiple access (TDMA), frequency division multiple access (FDMA), and various enhancements and improvements thereto which are generally referred to as next generation mobile communications systems.

CDMA is most widely accepted and continues to develop and evolve. In particular, CDMA technology evolution (such as the so-called "cdma2000" technology or other next generation CDMA systems) will provide integrated voice with simultaneous high-speed packet data, video and video conferencing capabilities. Currently, the third generation (3G) evolution of cdma2000 1x wireless communications is being reviewed or partially adopted by certain standards bodies, such as 3GPP and 3GPP2 (The Third Generation Partnership Project 2).

For example, a baseline framework for cdma2000 1xEV-DV (1xEVolution—Data and Voice) was recently reached by the 3GPP2. The 1xEV-DV standard will be backward compatible with existing CDMA IS-95A/B and CDMA2000 1x systems, allowing various operators seamless evolution for their CDMA systems. Other types of systems that are evolving from CDMA include High Data Rate (HDR) technologies, 1xEvolution—Data Only (1xEV-DO) technologies, and the like, which will be explained in more detail hereinafter.

The present disclosure focuses on data transmission techniques between base stations and mobiles. Thus, a detailed description of additional components, elements and processing procedures (not specifically mentioned herein) have been omitted so that the features of the present invention are not obscured. One skilled in the art would have understood that various other components and techniques associated with base stations and mobiles already known in the art but not described in detail herein, are also part of the present invention. For example, specific details of the protocol architecture having an air interface with a layered structure, physical layer channels, protocol negotiation and processing, and the like have been omitted.

In a communications system, a set of "channels" allow signals to be transmitted between the access network (e.g., a base station) and the access terminal (e.g., a mobile) within a given frequency assignment. Channels consist of "forward channels" and "reverse channels."

Signal transmissions (data transmissions or transfers) from the base station to a mobile via a downlink (i.e., forward channels) are commonly referred to as the "forward link," while signal transmissions from the mobile to the base station via an uplink (i.e., reverse channels) are commonly referred to as the "reverse link."

So-called "physical layers" provide the channel structure, frequency, power output, modulation, and encoding specifications for the forward and reverse links. The "forward channels" consist of those physical layer channels transmitted from the access network to the access terminal, and "reverse channels" consist of those physical layer channels transmitted from the access terminal to the access network.

Of the many portions of the forward and reverse channels, the "forward MAC channel" is the portion of the forward channel dedicated to medium access control (MAC) activities. The forward MAC channel consists of the reverse power control (RPC) channel, the reverse activity (RA) channel, and other channels. Here, the forward MAC reverse activity (RA) channel indicates the activity level (e.g., the load) on the reverse channel.

In the so-called Interim Standard 95A (IS-95A) systems, the forward link and the reverse link are allocated separate frequencies and are independent of one another. For code division multiple access (CDMA) technology is the basis for Interim Standard 95 (IS-95) and can operate in both the 800-MHz and 1900-MHz frequency bands. In CDMA systems, communications between users are conducted through one or more cells/sectors, which are serviced by base stations. A user of a first mobile communicates with another user on a second mobile by transmitting voice and/or data on the reverse link to a cell/sector. The cell/sector receives the data for routing to another cell/sector or a public switched telephone network (PSTN). If the second user is on a remote station, the data is transmitted on the forward link of the same cell/sector, or a second cell/sector, to the second remote station. Otherwise, the data is routed through the PSTN to the second user on the standard phone system.

A mobile communications system can employ connectionless network services in which the network routes each data packet individually, based on the destination address carried in the packet and knowledge of current network topology. The packetized nature of the data transmissions from a mobile allows many users to share a common channel, accessing the channel only when they have data to send and otherwise leaving it available to other users. The multiple access nature of the mobile communications system makes it possible to provide substantial coverage to many users simultaneously with the installation of only one base station in a given sector.

The transfer of digital data packets differs from the transfer of digital voice information. Full duplex (simultaneous two-way) voice communication patterns imply that the data, transferred between the base station and a particular mobile station, are real-time and substantially equal in bandwidth. It has been noted that a total delay of 200 msec (about 2 Kbits of digital data for most speech vocoders)

represents intolerable latency within a voice channel. On the other hand, transfer of digital data packets is typically asymmetrical, with many more packets being sent from the base station to a particular mobile via a downlink (the forward link), than from the mobile to the base station via an uplink (the reverse link).

In high speed data packet transfers, users appear to be tolerant of data transfer latencies or delays, with latencies of up to 10 seconds being encountered in current wireless data systems. While such delays appear to be tolerated by the user, the delays, attributable to relatively low effective data transfer rates, are undesirable. One proposed solution, known as "CDMA/HDR" (Code Division Multiple Access/ High Data Rate), uses various techniques to measure channel data transfer rate, to carry out channel control, and to mitigate and suppress channel interference.

Conventional CDMA systems must handle both voice and data. To handle voice signals, the delay between the time that information is sent and the time that the information is received must be kept relatively short. However, certain communications systems used mostly for handling data packets can tolerate relatively longer delays or latencies between the time that information is sent and the time that the information is received. Such data handling communications systems can be referred to as High Data Rate (HDR) systems. The following description will focus on HDR systems and techniques, but those skilled in the art would understand that various other mobile communications systems and techniques for handling high data rates, such as 1xEV-DO, 1xEV-DV, and the like, fall within the scope of the present disclosure.

In general, a High Data Rate (HDR) system is an Internet protocol (IP) based system that is optimized for transmitting data packets having bursty characteristics and not sensitive to latencies or delays. In HDR systems, a base station is dedicated to communicating with only one mobile station at any one time. An HDR system employs particular techniques allowing for high-speed data transfers. Also, HDR systems are exclusively used for high-speed data transfers employing the same 1.25 MHz of spectrum used in current IS-95 systems.

The forward link in an HDR system is characterized in that the users are not distinguished in terms of orthogonal spreading codes, but distinguished in terms of time slots, whereby one time slot can be 1.67 ms (milliseconds). Also, on the forward link of an HDR system, the mobile (access terminal AT) can receive data services from about at least 38.4 Kbps to about at most 2.4576 Mbps. The reverse link of an HDR system is similar to the reverse link of an IS-95 system, and employs a pilot signal to improve performance. Also, traditional IS-95 power control methods are used for providing data services from about 9.6 Kbps to about 153.6 Kbps.

In the HDR system, a base station (a part of the access network AN) can always transmit signals at its maximum transmission power, as virtually no power control is required because only one user occupies a single channel at a particular time resulting in practically no interference from other users. Also, in contrast to an IS-95 system requiring an equal data transfer rate for all users, an HDR system need not deliver packet data to all users at equal data transfer rates. Accordingly, users receiving high strength signals can receive services employing high data rates, while users receiving low strength signals can be accorded with more time slots so that their unequal (i.e., lower) data rate is compensated.

In conventional IS-95 systems, because various signals (including pilot signals) are simultaneously transmitted to all users, interference due to pilot signals and undesirably high power consumption are problematic. However, in HDR systems, pilot signals can be transmitted at maximum power because the so-called "burst" pilot signals are employed. Thus, signal strength can be measured more accurately, error rates can be reduced, and interference between pilot signals is minimized. Also, as the HDR system is a synchronous system, pilot signals in adjacent cells are simultaneously transmitted, and interference from pilot signals in adjacent cells can also be minimized.

FIG. 1 shows a portion of a conventional reverse channel structure for sending transmission data rate increase information from a base station to a mobile. A base station (not shown) approximates (or measures) a load on the reverse link, and prepares to send to a mobile (not shown) various messages indicating whether the reverse link load is large or small. A bit repetition means 10 repeats the bits in the messages to be sent a certain number of times to improve signal reliability.

Thereafter, a signal point mapper 11 maps the signal from the bit repetition means 10 by, for example, changing all "0" bits to "+1" and all "1" bits to "−1" to allow further processing. The resulting signal is combined with a so-called "Walsh cover" signal and transmitted over the Reverse Activity (RA) channel to the mobile.

A conventional mobile receives the messages sent by the base station via the RA channel indicating that the current reverse link load is too large, and the mobile reduces the current packet data rate on the reverse link by one-half (½) so that the load on the reverse link is decreased.

SUMMARY OF THE INVENTION

A gist of the present invention involves the recognition by the present inventors of the drawbacks in the previously known art. In particular, previously known techniques (e.g., mobile communications systems under the standards of IS-95, HDR, IMT-2000, etc.) for controlling data transmission rates between mobiles and a base station do not effectively consider the particular data transmission circumstances and channel conditions of each mobile station.

Previously known HDR systems do not employ effective power control techniques, thus there are difficulties in providing high-speed data transmissions to those mobiles located far from the base station requiring signal transmissions at a higher power compared with the signal transmissions for mobiles located in proximity to the base station requiring only low level power.

The previously known HDR system is disadvantageous in that, when the base station detects the load on the reverse link to be too large and feeds back this information via a reverse activity (RA) channel, the reverse link packet data rate is unconditionally reduced by one-half for all users (mobiles), and thus overall data throughput at each base station is undesirably reduced. The previously known art ignores the situations that individual mobiles have different requirements and should advantageously be controlled individually in a dedicated manner.

Additionally, the previously known HDR system is inefficient because no messages are sent to the mobiles to indicate that their packet data rates should be increased when the reverse link load is small.

Furthermore, the previously known art merely considers the reverse link load. However, in practical data packet transmission applications, the channel or link conditions, such as signal interference and transmission power requirements, and other communications environment factors effect data transmissions on the reverse link.

To address at least the above-identified previously known art problems, the present invention utilizes information fed back from the forward link for data packet transmission over the reverse link upon considering the particular data transmission circumstances and channel conditions of each mobile station and accordingly controlling the mobiles in a dedicated manner. By doing so, the data transmission rate over the reverse link is improved. More specifically, to improve reverse link data transmission rates, messages informing the mobile station to adjust (increase, decrease or maintain) its data transmission rate are sent from the base station in accordance with reverse link load information.

BRIEF DESCRIPTION OF THE DRAWINGS

FIG. 10 shows an example of how the reverse link data rate is controlled using the BS_RCV values according to the present invention.

DETAILED DESCRIPTION OF THE PREFERRED EMBODIMENT

Figure 1:
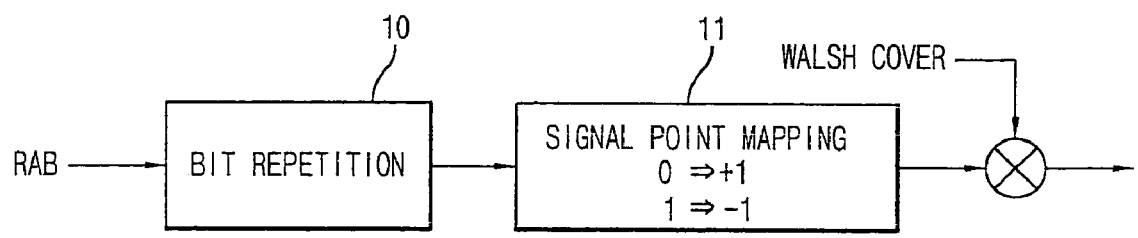
FIG. 1 shows a portion of a conventional reverse channel structure for sending transmission data rate increase information from a base station to a mobile.
Figure 2:
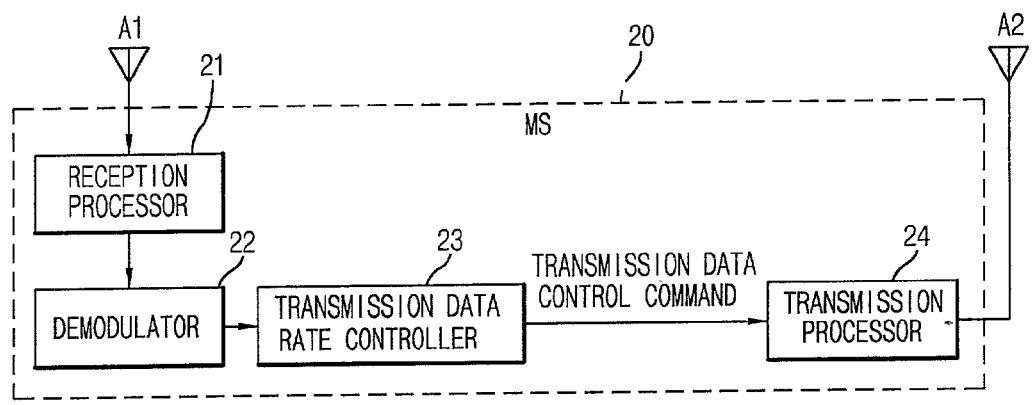
FIG. 2 shows a partial structure of a mobile according to an embodiment of the present invention.

FIG. 2 shows a partial structure of a mobile according to an embodiment of the present invention. A mobile 20 comprises a reception processor 21, a demodulator 22, a transmission data rate controller 23, and a transmission processor 24. The reception processor 21 processes the signals received from a base station via a reception antenna A1. The demodulator 22 demodulates the signals processed by the reception processor 21. The transmission data rate controller 23 controls the transmission data rate based on the transmission data rate adjustment information in the signals processed by the demodulator 22. The transmission processor 24 transmits signals via a transmission antenna A2 to the base station in accordance with the control of the transmission data rate controller 23.

According to FIG. 2, the mobile according to an embodiment of the present invention can comprise a determining means which determines a transmission energy level required for transmitting to a base station. Here, the determining means can comprise the transmission data rate controller 23 and the transmission processor 24, in their entirety or portions thereof.

Also, the mobile according to an embodiment of the present invention can comprise an adjusting means operatively connected with the determining means, which adjusts a data transmission rate based upon a comparison result received from the base station in a dedicated manner via a common channel, the comparison result being obtained by comparing the transmission energy level and an interference level of signals sent to the base station by the mobile stations. Here, the adjusting means can comprise the transmission data rate controller 23, and the transmission processor 24, in their entirety or portions thereof.

Furthermore, the mobile according to an embodiment of the present invention can comprise a transceiver operatively connected with the adjusting means, which transmits packet data on the reverse link in accordance with the adjusted data transmission rate. Here, the transceiver can comprise the reception processor 21, the demodulator 22, the transmission processor 24, and antennae A1 and A2, in their entirety or portions thereof.

Figure 3:
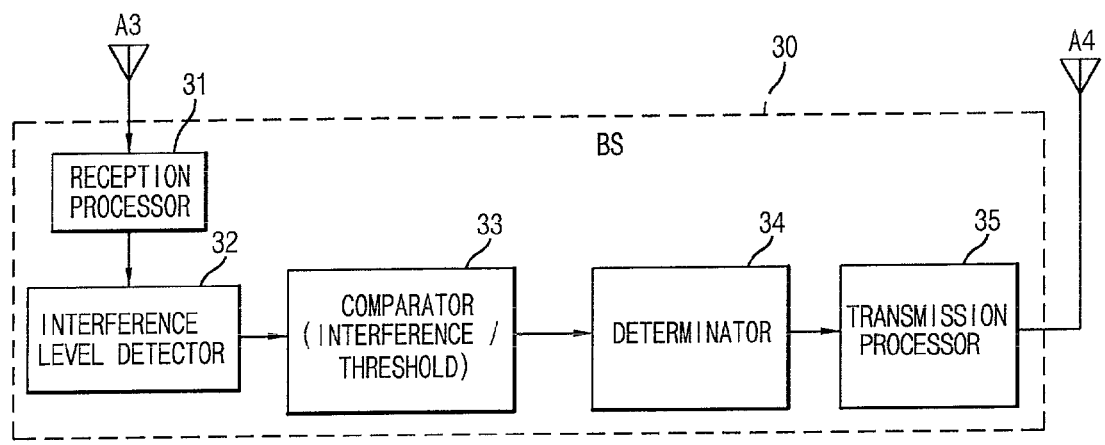
FIG. 3 shows a partial structure of a base station according to an embodiment of the present invention.

FIG. 3 shows a partial structure of a base station according to an embodiment of the present invention. A base station 30 comprises a reception processor 31, an interference level detector 32, a comparator 33, a determinator 34, and a transmission processor 35. The reception processor 31 processes (e.g., demodulates) the signals received from mobiles (not shown) via a reception antenna A3. The interference level detector 32 receives the processed signals from the reception processor 31 for estimating and/or detecting a level of signal interference related to the processed signals.

As understood by those skilled in the art, there are various types of signal interference between mobiles and base stations in mobile communications. For example, in the case of the reverse link, an important parameter is the rise in the level of the total amount of noise over the level of the thermal noise at a base station. This parameter is referred to as the "rise over thermal" (ROT). The rise over thermal (ROT) corresponds to the loading of the reverse link.

Typically, a communications system attempts to maintain the ROT near a predetermined value. If the ROT is too great, the range of the cell is reduced and the reverse link is less stable. A large ROT can also cause small changes in instantaneous loading that result in large excursions in the output power of the mobile station. When the ROT is considered to be too high (e.g., above a desired threshold level), the data transmission rate can be decreased or even interrupted until the reverse link is stabilized. In contrast, a low ROT can indicate that the reverse link is not heavily loaded, thus potentially wasting available capacity. Thus, if the ROT is considered to be too low (e.g., below a desired threshold level), the data transmission rate can be advantageously increased. It will be understood by those skilled in the art that methods other than measuring the ROT can be used in determining the loading of the reverse link.

After the interference level detector 32 detects the signal interference, the comparator 33 compares the detected level of signal interference with a threshold value in order to estimate (determine) the load on the reverse link. The determinator 34 determines a transmission data rate adjust information (e.g., increase, decrease or maintain) based on the reverse link load determined by the comparator 33, and determines a position of each mobile (i.e., a physical location of each mobile in the cell/sector served by the base station) based on the rate control bit (RCB) position in the channel slots. The RCB position in the channel slots allows mobiles to be discriminated from one another.

The transmission processor 35 modulates a transmission signal for sending the transmission data rate adjust information from the determinator 34 to each mobile, and transmits signals to each mobile via a transmission antenna A4. Here, the signals including the RCB information are transmitted to each mobile via a common channel. The common channel can be a known channel already used in conventional mobile communications. For example, the so-called "RA channel" can be employed in the present invention for transmitting signals and RCB information to each mobile. Alternatively, the signals including the RCB information are transmitted to each mobile via a newly established channel (Common Reverse Packet Data Control Channel—CRPD-CCH), not currently existing in conventional mobile communications systems and techniques. Here, various conventional techniques may be employed in establishing a new type of channel, with a feature of the present invention being the use of rate control bit (RCB) in the frames (16 slots) transmitted to the mobiles.

According to FIG. 3, a base station according to an embodiment of the present invention can comprise a determining means, which determines an interference level of signals received from the mobile stations, and determines a transmission energy level required for each mobile station. Here, the determining means can comprise the interference level detector 32 and the comparator 33, in their entirety or portions thereof.

Also, a base station according to an embodiment of the present invention can comprise a comparing means operatively connected with the determining means, which compares the interference level with the transmission energy level to obtain a comparison result for each mobile station. Here, the comparing means can comprise the comparator 33 and determinator 34, in their entirety or portions thereof.

Additionally, a base station according to an embodiment of the present invention can comprise a transceiver operatively connected with the comparing means, which sends the comparison result via a common channel on a forward link to each mobile station in a dedicated manner in accordance with the comparing, and receives packet data on the reverse link in response to the sending. Here, the transceiver can comprise a reception processor 31, transmission processor 35, and antennae A3 and A4, in their entirety or portions thereof.

Accordingly, by using the general features of a mobile shown in FIG. 2 and the features of a base station shown in FIG. 3, data packets can be transmitted between the mobile and base station in accordance with the present invention. A more detailed description and explanation of the structural aspects and methods involved in the present invention are as follows.

Figure 4:
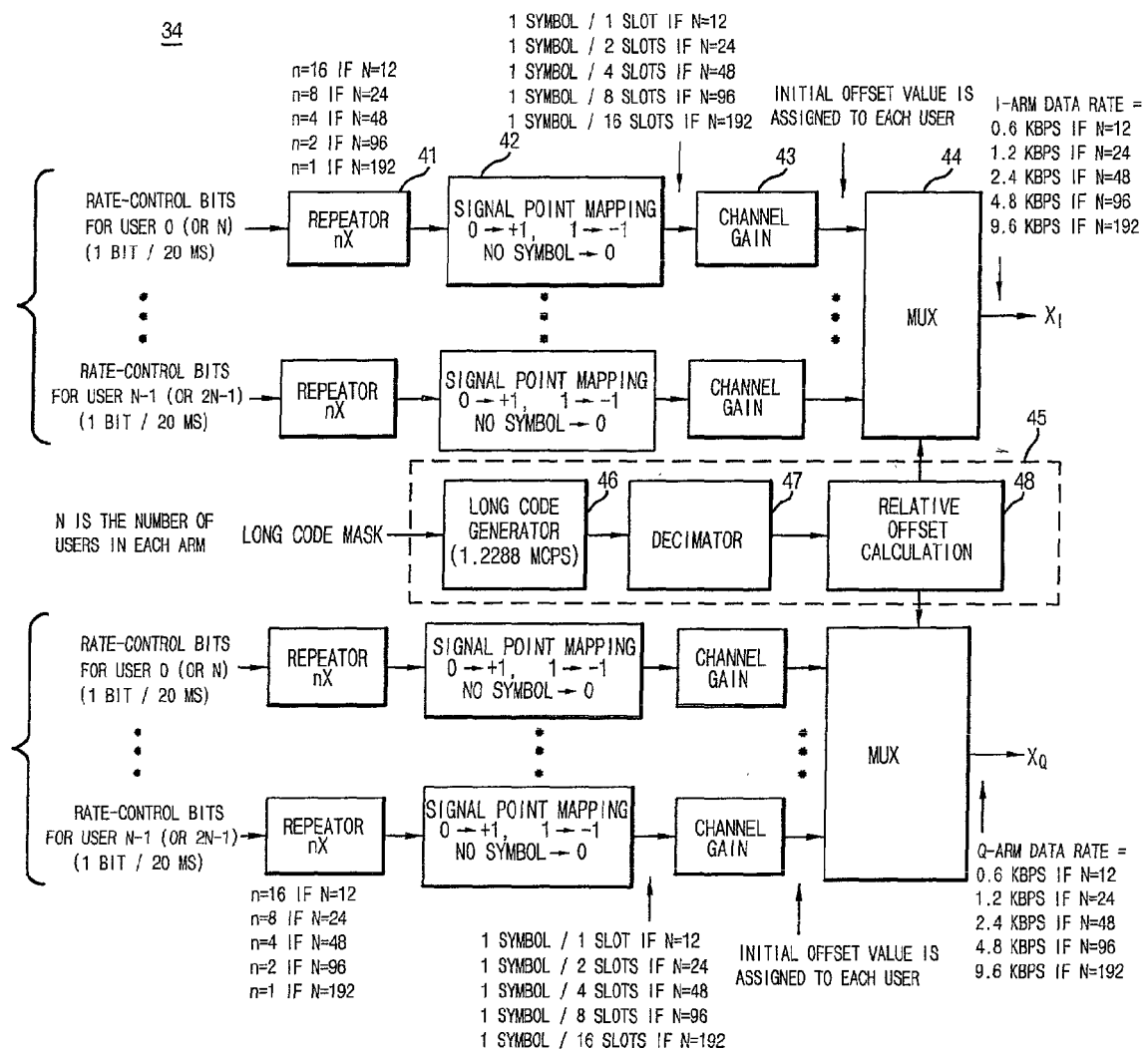
FIG. 4 shows the details of certain relative portions of the determinator 34 in a base station, a portion of which is shown in FIG. 3.

FIG. 4 shows the details of certain relative portions of the determinator 34 in the base station shown in FIG. 2. The determinator 34 comprises a plurality of repeaters 41, a plurality of signal point mappers 42, a plurality of channel gain units 43, a pair of multiplexors 44, and a long code processor 45 having a long code generator 46, a decimator 47, and a relative offset calculator 48.

In the present invention, mobiles can be controlled via the so-called "I-channel" or "Q-channel" or both channels. Here, "I" refers to "in-phase" and "Q" refers to "quadrature," which are known terms in the art of digital signal modulation, in particular vector modulation. Vector modulation (of which quadrature amplitude modulation (QAM) is a popular type) is at the heart of most digital wireless (mobile) communication systems. QAM packs multiple data bits into single symbols, each of which modulates the carrier's amplitude and phase.

Of the reverse link load determined by the comparator 33, rate-control bits (e.g., RCBs) for each user (mobiles) 0 through N are sent to the determinator 34. Here, N denotes the number of users being controlled using the I-channel and/or Q-channel, which are also referred to as an "I-Arm" and a "Q-Arm." Based upon the RCBs transmitted to the mobiles during one data frame (the frame having 16 slots), the base station can control a plurality of mobiles using the I-channel, the Q-channel, or both.

The repeaters 41 of the determinator 34 receive the RCB data (including rate-control bits) related to a plurality of users (mobiles) 0 through N, and respectively processes these data for ultimately generating I-signals ($X_I$) and/or Q-signals ($X_Q$).

For example, 12, 24, 48, 96, 192 or 384 mobiles can be controlled by the base station according to the present invention. If only the I-channel or the Q-channel is used, 12, 24, 48, 96 or 192 mobiles can be controlled. If both the I-channel and Q-channel are used, 24, 48, 96, 192 or 384 mobiles can be controlled. When either the I-channel or the Q-channel is used to control 12 mobiles, the repeater 41 repeats the bits in the messages to be sent 16 times to improve signal reliability. In this manner, for respectively controlling 24, 48, or 96 mobiles, 8, 4, or 2 repetitions are performed, respectively. For controlling 192 mobiles, no repetitions are made. Namely, instruction signals are sent to the mobiles without performing any bit repetitions. In a similar manner, when both the I-channel and the Q-channel are used, for respectively controlling 24, 48, 96 or 192 mobiles, 16, 8, 4, or 2 repetitions are performed. For controlling 384 mobiles, instruction signals are sent to the mobiles without performing any bit repetitions.

Although a particular number of mobiles capable of being controlled have been exemplified above based upon there being 16 slots in a frame to be transmitted, those skilled in the art would understand that other specific number of mobiles could also be handled according to the present invention depending upon the particular frame size and number of slots therein.

Then, the signal point mappers 42 map the signals received from the repeaters 41 by, for example, changing all "0" bits to "+1", all "1" bits to "−1", and no symbol bits to "0" to allow further processing.

Here, the signal point mapping techniques can generally be performed in a variety of ways, as understood by those skilled in the art. However, a preferred method in signal point mapping according to the present invention involves a particular technique of processing the RCBs. Namely, based upon the transmission data rate adjust information, if the current transmission data rate is to be increased, the base station sets the RCB to "INCREASE" and if the current transmission data rate is to be decreased, the base station sets the RCB to "DECREASE" Also, if current transmission data rate is to be maintained, no RCB information is transmitted by the base station to the mobile.

Also, the number of slots used for processing a symbol depends upon the number of users N. For example, if N=12, 1 symbol per 1 slot is processed. Also, for N=24, 48, 96 or 192, 1 symbol/2 slots, 1 symbol/4 slots, 1 symbol/8 slots, and 1 symbol/16 slots are processed, respectively, as indicated in FIG. 4.

Thereafter, the channel gain units 43 further process each signal received from the signal point mappers 42, respectively. Namely, channel gain amplification is performed and the processed signals are sent to the multiplexers (MUX) 44, the features of which are explained further below. Here, the channel gain amplifying techniques can generally be performed in a variety of ways, as understood by those skilled in the art.

Additionally, the RCB data related to I-Q signal generation includes initial offset values (0 to N−1) assigned to each user (mobile) and which determine the position of each mobile (based on the RCB position in the channel slots). Here, the initial offset values are determined (or generated) during a so-called "negotiation" process between mobiles and the base station. Of the initial offset values, "0" indicates the first position among the channel slots, while "N−1" indicates the last position.

The determinator 34 also includes a long code processor 45 comprising a long code generator 46, a decimator 47 and a relative offset calculator 48. The long code processor 45 receives a long code mask for the common reverse packet data control channel (CRPDCCH) and outputs relative offset values used for generating an I-signal and a Q-signal. Here, for the relative offset values, the RCB positions allocated to each mobile are preferably randomized. Namely, the RCBs are inserted into different slot positions in each frame. As such, the RCB position in the channel slots allows mobiles to be discriminated from one another.

Finally, the multiplexers (MUX) 44 respectively combine the initial offset values assigned to each user with the relative offset values (generated by the long code processor 45), and the processed signals from the channel gain units 43, so that the RCB positions in the channel slots are determined, As a result, the multiplexed signals $X_I$ and $X_Q$ for the I-channel, the Q-channel, or both are outputted from the determinator 34 for further processing at the transmission processor 35 and subsequent transmission to the mobiles.

Figure 5:
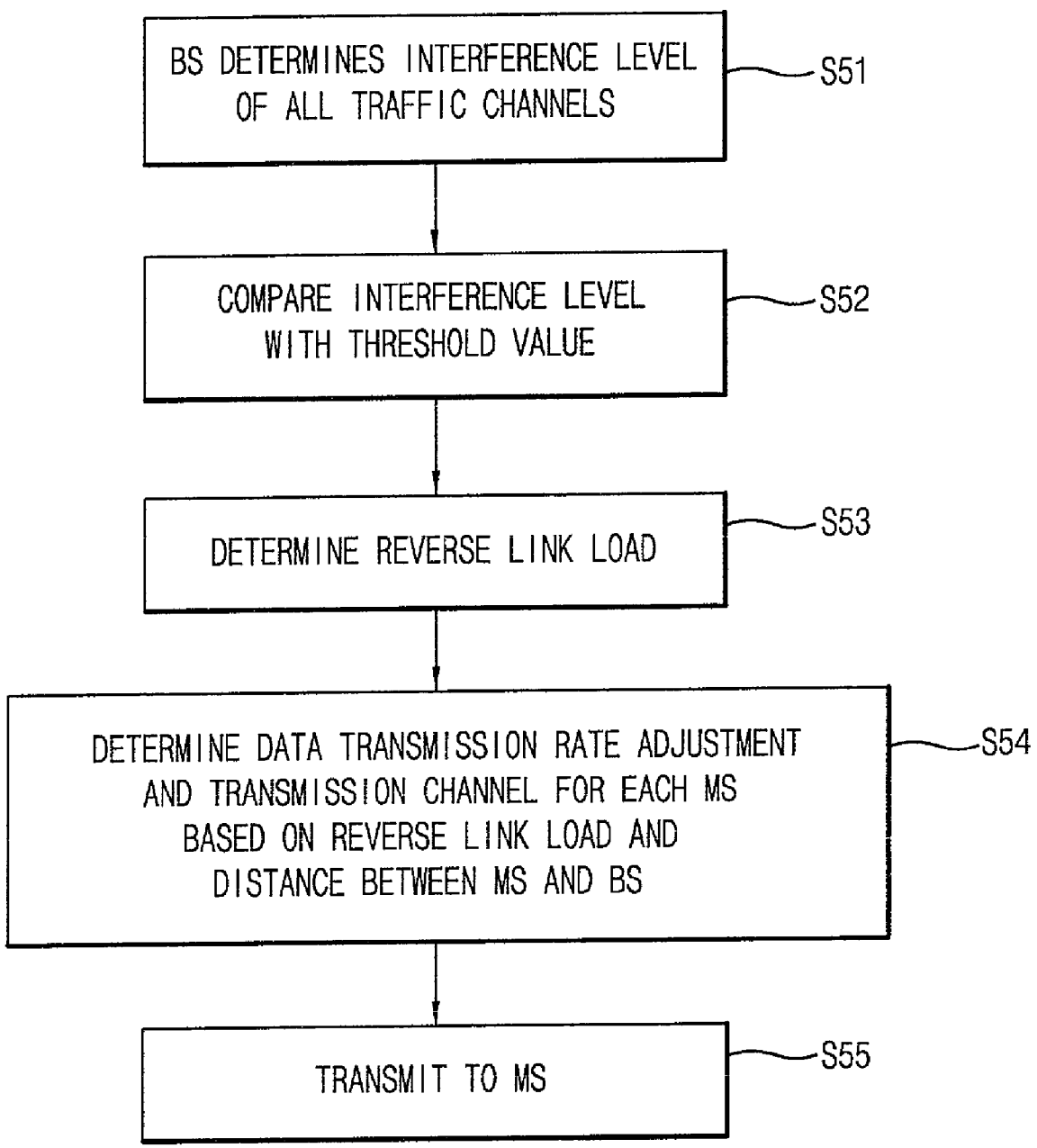
FIG. 5 is a flow chart showing the main steps involved in transmitting transmission data rate adjust information to each mobile in a 1xEV-DV or 1xEV-DO system according to the present invention.

FIG. 5 is a flow chart showing the principle steps involved in transmitting transmission data rate adjust information to each mobile in a 1xEV-DV or 1xEV-DO system according to an embodiment of the present invention. First, the base station detects and determines a level of interference among all communication traffic channels (S51). The detected interference level is compared with a threshold so that the load on the reverse link can be approximated (S52, S53). Transmission data rate adjust information is determined by the reverse link load and information regarding the distance from each mobile to the base station, and as previously explained in view of FIG. 4, the multiplexers 41, 41' combine the initial offset values (from the I-signals and Q-signals) with the relative offset values (from decimating the codes from the long code generator 46) so that the RCBs positions in the channel slots are determined for discriminating each mobile from one another (S54). Finally, the RCBs are transmitted to the mobiles via a common channel, which operate in a dedicated manner (i.e., exclusively) for each mobile (S55).

Upon receiving the RCBs from the base station, the mobiles preferably adjust their transmission data rates in increments for gradual increasing or decreasing. Then, the mobiles may inform the base station of the adjusted transmission data rate which they intend to use by sending to the base station a reverse rate indicator (RRI). Thereafter, packet data are transmitted to the base station on the reverse link at the adjusted data rate. Accordingly, employing the techniques of the present invention can advantageously increase data throughput.

The instructions (based upon RCBs) sent by the base station to the mobiles for adjusting (increasing, decreasing or maintaining) the transmission data rate of a mobile during the reverse link will be referred to as "RC instructions." In the present invention, the base station preferably sends RC instructions to the mobiles during a single frame, for controlling the transmission date rate of the mobiles during the next frame. However, those skilled in the art can understand that the sending of RC instructions may extend into a subsequent frame in certain situations.

Figure 6:
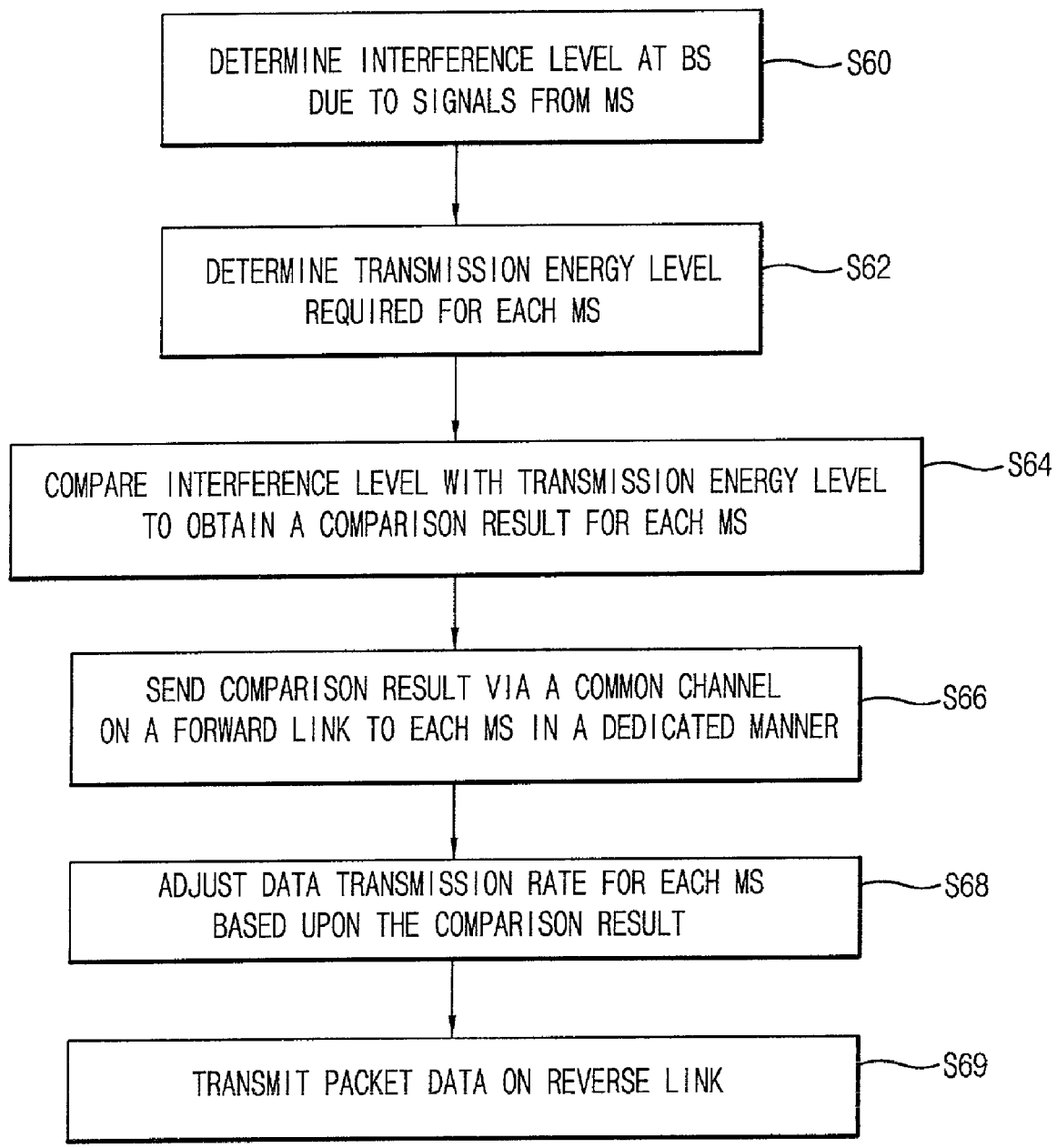
FIG. 6 is a flow diagram of the method for controlling the data transmission rate in accordance with the present invention.

FIG. 6 shows a flow diagram of the method for controlling the data transmission rate in accordance with the present invention. For controlling a data transmission rate on a reverse link in a mobile communications system having a plurality of base stations and a plurality of mobile stations, a first step of determining an interference level at a base station due to signals from the mobile stations served by the base station is performed (S60). Also, a step of determining a transmission energy level required for each mobile station is performed (S62). Next, the interference level is compared with the transmission energy level to obtain a comparison result for each mobile station (S64).

Thereafter, the comparison result is transmitted by the base station to the mobile via a common channel on a forward link in a dedicated manner (S66). Here, the base station transmits respective comparison results to each mobile in a dedicated manner. In other words, the base station sends a particular comparison result to a particular mobile (having a particular interference level and required transmission energy level previously determined) so that each mobile is individually controlled to have an appropriate data transmission rate.

Subsequently, each mobile adjusts its current data transmission rate based upon the comparison result sent from the base station via a common channel on a forward link in a dedicated manner (S68). Finally, packet data are transmitted on the reverse link from a mobile to the base station in accordance with the adjusted data transmission rate (S69).

In other words, a method for controlling a data transmission rate on a reverse link according to the present invention can comprise the steps of determining an interference level at a base station due to signals from the mobile stations served by the base station; determining a transmission energy level required for each mobile station; comparing the interference level with the transmission energy level to obtain a comparison result for each mobile station; and adjusting a data transmission rate for each mobile station based upon the comparison result sent via a common channel on a forward link to each mobile station in a dedicated manner.

Also, a method for controlling a data transmission rate on a reverse link according to the present invention can comprise the steps of determining an interference level of signals received from the mobile stations; determining a transmission energy level required for each mobile station; comparing the interference level with the transmission energy level to obtain a comparison result for each mobile station; and sending the comparison result via a common channel on a forward link to each mobile station in a dedicated manner in accordance with the comparing.

Additionally, a method for controlling a data transmission rate on a reverse link according to the present invention can comprise the steps of determining a transmission energy level required for transmitting to the base station; adjusting a data transmission rate based upon a comparison result received from the base station in a dedicated manner via a common channel, the comparison result being obtained by comparing the transmission energy level and an interference level of signals sent to the base station by the mobile stations; and transmitting packet data on the reverse link in accordance with the adjusting.

The above-described techniques of employing RCB according to an embodiment of the present invention improve the conventional techniques (e.g., conventional communications systems under the standards of IS-95, HDR, IMT-2000, etc.) for controlling transmission data rates between mobiles and a base station. However, the present inventors recognized that additional improvements are also possible.

For example, the particular communication conditions of each mobile may be further considered in addition to the overall signal interference at the base station (including ROT parameters) described previously hereinabove. By considering the factors at each mobile, different mobiles can receive different instructions to adjust their respective transmission data rates in a different manner, instead of all mobiles receiving the same instruction to increase or decrease their transmission data rates by an equal amount.

In conventional techniques, each mobile performs an internal test upon receiving a transmission data rate adjust instruction (an RA instruction) from its base station, instead of immediately adjusting its current transmission data rate. In other words, each mobile further considers its own communications conditions prior to adjusting its transmission data rate.

The internal test conducted by the mobile involves the determination of the probability that the data transmission rate in the next frame will likely increase or decrease. Namely, if the current data transmission rate is relatively low for the current frame, there is a relatively high probability that the data transmission rate should be increased in the next frame, and there is a relatively low probability that the data transmission rate should be decreased in the next frame.

For example, suppose that a communications system can transmit data at five different rates: 9,600 bps; 19,200 bps; 38,400 bps; 76,800 bps; and 153,600 bps. Assuming that a first mobile (A) is transmitting data at 19,200 bps during the current frame, while a second mobile (B) is transmitting data at 76,800 bps in the current frame. Then, if the base station sends to the mobiles that it is serving, an instruction to increase the current data transmission rate, mobile A has a greater probability of operating at a higher data transmission rate compared to mobile B. In contrast, if the base station sends to the mobiles that it is serving, an instruction to decrease the current data transmission rate, mobile B has a greater probability of operating at a lower data transmission rate compared to mobile A.

In other words, a method for controlling a data transmission rate on a reverse link according to the present invention can comprise the steps of detecting a total interference amount received by a base station; determining a transmission energy level required by a mobile station based upon a cell interference probability of each mobile station; receiving transmittable data rate information of each mobile station; and generating data rate control information in accordance with the total interference amount, the transmission energy level, and the data rate information for controlling a data transmission rate on a reverse link.

The present invention considers the channel condition or state for each mobile, the valid data rate for transmitting within a frame, and the signal interference at the base station, such that the base station individually controls the reverse link data rate for each mobile in a dedicated manner. To achieve this control, various parameters for the base station and mobiles can be used. These parameters are defined as follows.

1) Mobile Station Priority (MS_PRI)

MS_PRI is a parameter used for determining a probability of cell interference of each mobile, and is obtained by using the following equation (1):

$$\text{MS\_PRI} = \frac{\alpha_j}{\sum\limits_{i}^{All} \alpha_i - \alpha_j} \approx \frac{\beta_j}{\sum\limits_{i}^{All} \beta_i - \beta_j}; \quad (1)$$

This parameter can be calculated by the base station itself or by the mobile, which informs the base station of the MS_PRI value in a periodic manner or whenever the channel environment of the mobile changes.

In equation (1), $\alpha_i$ denotes the reverse link channel gain between the mobile and the i-th base station, while $\alpha_j$ denotes the reverse link channel gain between the mobile and the j-th base station which has the largest channel gain of all base stations. Also, $\beta_i$ denotes the forward link channel gain between the mobile and the i-th base station, while $\beta_j$ denotes the forward link channel gain between the mobile and the j-th base station which has the largest channel gain of all base stations.

When fading is not considered (i.e., ignored), the channel gain of the forward link and the channel gain of the reverse link can be considered to be the equivalent. Thus, the approximation:

$$\frac{\alpha_j}{\sum\limits_{i}^{All} \alpha_i - \alpha_j} \approx \frac{\beta_j}{\sum\limits_{i}^{All} \beta_i - \beta_j}$$

of equation (1) is satisfied.

Also, assuming that the total transmission power of all base stations are approximately the same, when the total transmission power of the base station is multiplied to the channel gain (i.e., multiply the total transmission power of the base station by $\beta_i$), the resulting value is equivalent to the total signal power received by one mobile from the i-th base station (i.e., Ior). Thus, the approximation:

$$\text{MS\_PRI} \approx \frac{\max\_\text{Ior}_j}{Io - \max\_\text{Ior}_j}$$

of equation (1) is satisfied, and the MS_PRI value can be determined.

In equation (1), Io denotes the total sum of the signal power from all base stations received by the mobile (i.e., sum of Ior received from all base stations), and max_Ior$_j$ denotes the signal power received from the j-th base station which has the strongest reception signal power of all base stations.

The MS_PRI value, indicates in an inversely proportional manner, how a particular mobile, on average, causes cell interference to other cells. A large MS_PRI value means that the probability of causing cell interference is low, while a small MS_PRI value means that the probability of causing cell interference is high. In other words, a large MS_PRI value indirectly indicates a high probability that the mobile is located near a base station or that the mobile is located in a place where the channel state is satisfactory, while a small MS_PRI value denotes the opposite.

The MS_PRI value can be calculated in at least the following three different methods.

First, the mobile calculates the MS_PRI value using the Io value detected from the total sum of signal power received from all base stations, and the max_Ior value of the base stations having the greatest reception signal power, and thereafter the MS_PRI value is directly transmitted to the base station.

Second, the mobile sends to the appropriate base station, the Ec/Io value of the pilot signal (Ec) power received from each base station using the pilot signal measurement message (PSMM) reported to the base station. Then, the base station receiving the Ec/Io value uses this to calculate the MS_PRI value.

Third, when there exists a reverse link channel (such as the data rate control (DRC) channel in 1xEV-DO systems) for informing the channel state of the forward link, the base station uses the forward link channel state value (such as the Ec/Nt of the pilot signal (Ec)) transmitted via this channel to calculate the MS_PRI value.

2) Mobile station reverse control value (MS_RCV)

The MS_RCV value is a parameter used for determining the transmission energy value necessary for each mobile,). First, a function $f(x)$ is defined, a calculation using the following equation (2) is performed.

$$MS\_RCV = f(\text{Current\_Assigned\_Data\_Rate})[dB] - \alpha * MS\_PRI[dB] \quad (2)$$

Here, the MS_RCV value may be indicated in units of dB. Also, "Current_Assigned Data_Rate" denotes the data rate being used in the current transmission frame, while $f(x)$ is a function related to the reception energy necessary for normally receiving data from a base station at a data rate of x. For example, if the "Current_Assigned Data_Rate" is 9600, we get a function $f(9600)=4dB$, which calculates in advance, a reception energy level for each data rate.

Thus, the MS_RCV value applies cell interference probabilities to the reception energy necessary for each mobile. Thus, the present invention employing the MS_RCV value can minimize the occurrence of cell interference by using a relatively low transmission energy level (transmit power) satisfy the reception energy level (reception power) requested by the base station, for those mobiles that are close to the base station or having a strong channel link.

In general, as the data rate increases, the reception energy required for each mobile also increases. Thus, as the "Current_Assigned_Data_Rate" is higher, the MS_RCV value increases.

In equation (2), the MS_PRI value in the term "α*MS_PRI" denotes the probability of causing interference to other cells. If the MS_PRI value is small (i.e., when there is a high probability of causing interference to other cells), the MS_RCV value becomes large.

Also, the value "α", which can be adjusted to control how the MS_PRI effects the MS_RCV, is a variable that controls the "fairness" between users (mobiles). The base station adjusts the a value so that all mobiles are guaranteed to have an appropriate data rate. For example, when α=0, the channel conditions for the mobile are not considered and the degree of fairness between the users (mobiles) is at a maximum. In contrast, as the a value increases, the channel conditions of each mobile have more effect on the MS_RCV value.

In summary, as the data rate of the current transmission is higher, and as the MS-PRI value is lower (i.e., as the probability of causing other cell interference is greater), the MS_RCV value increases. The base station calculates and manages the MS_RCV value for each active mobile.

3) Mobile Station Rate Increase Available Bit (MS_IAB)

The MS_IAB value is a parameter to provide data rate information for valid data that can be transmitted in the next frame by the mobile. The MS_IAB value has two states, "increase" and "unchanged," based on the following conditions.

If all the following conditions are met, the MS_IAB value is set as "increase," while if any one of these conditions is not met, the value is set as "unchanged."

I. When transmission power margin (i.e., remaining transmission power) is above a certain level;

II. When the number of bits in the transmission buffer is above a certain level; and III. When the data rate of the current transfer (i.e., Current_Assigned_Data_Rate) is below a maximum data rate (i.e., MAX_Data_Rate) set by the system.

Figure 7:
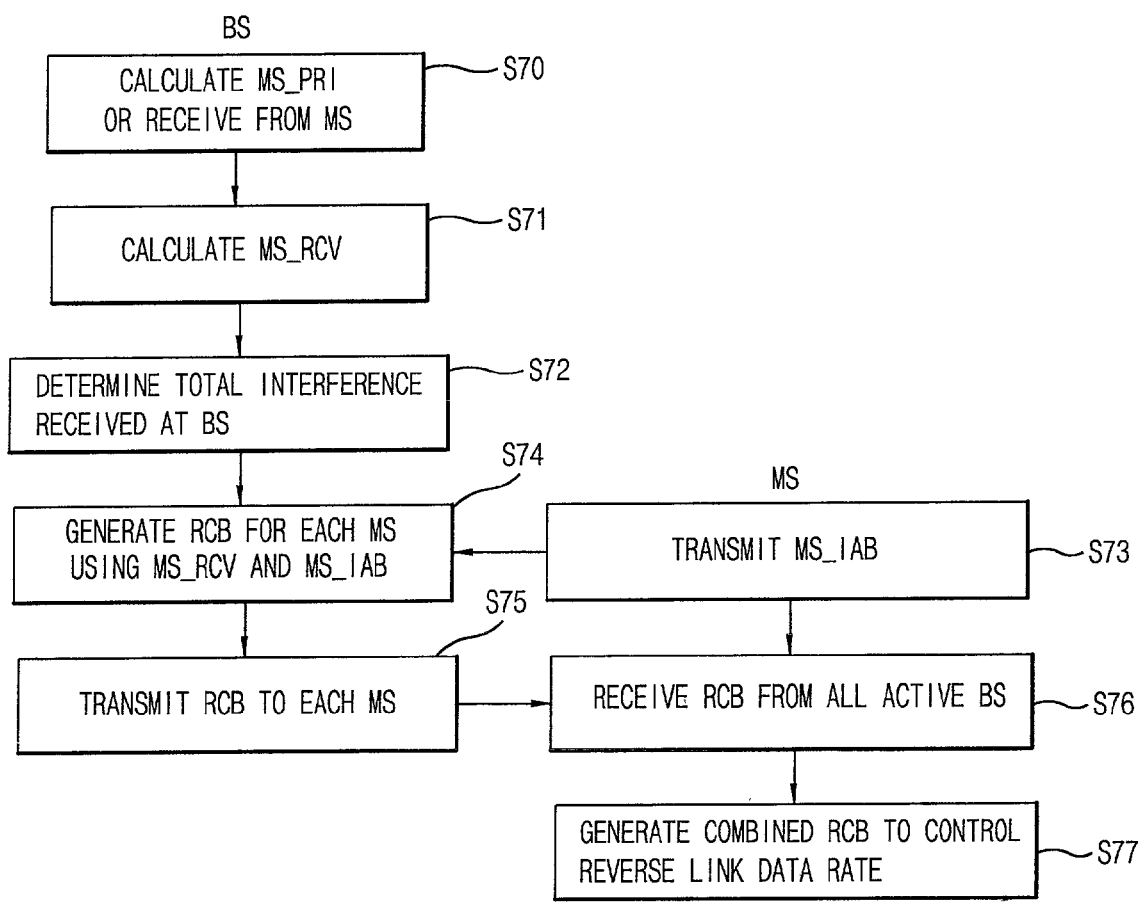
FIG. 7 is a flow diagram of embodiment according to the present invention.

As shown in FIG. 7, which is a flow diagram of embodiment according to the present invention, the base station uses the above-identified parameters (i.e., MA_PRI, MS_RCV, and MS_IAB) for controlling the data transmission rate of a mobile.

The base station receives the MS_PRI value reported from the mobile in a periodic manner or whenever the channel conditions of the mobile change, or directly calculates the MS_PRI value for updating thereof. Here, the MS_PRI value is initially set at 0 and updated thereafter (S70).

The base station uses the thusly obtained MS_PRI value and the data rate at which the mobile is transmitting, i.e., the "Current_Assigned_Data_Rate", for calculating and managing MS_RCV values for those mobiles that are in an active state with regard to the base station (S71).

Also, the base station detects the total interference (e.g., the rise over thermal (ROT) value) based on the total energy of signals received at the base station (S72). Thereafter, each mobile transmits the MS_IAB value to the base station in every frame (S73).

The base station uses the MS_RCV and MS_IAB values to generate a rate control bit (RCB) for controlling the data rate of each mobile (S74), and the RCB is transmitted to each mobile (S75). Here, the RCB can include three types of commands; an increase command for increasing the data rate of the mobile, a decrease command for decreasing the data rate, and a command for not changing the data rate.

If the ROT detected by the base station is deemed to be satisfactory (e.g., ROT<ROT_TH1, where ROT_TH1 is a first threshold value), the MS_RCV value is accordingly below a threshold value (RCV_TH), and of the mobiles having their MS_IAB values set as "increase," the RCB values for certain mobiles are set as "increase" while the RCB values for the remaining mobiles are set as "unchanged."

However, if it is determined that the ROT detected by the base station is maintained with a range (ROT_TH1~ROT_TH2) set by the system, the RCB values for all mobiles are set to "unchanged."

If the ROT detected by the base station is deemed to be unsatisfactory (e.g., ROT>ROT_TH2, where ROT_TH2 is a second threshold value), for those mobiles having a MS_RCV value exceeding the RCV-TH value, their RCB values are set as "decrease" while the RCB values for the remaining mobiles are set to "unchanged."

In the above method, the particular number of mobiles having their RCB values set as "increase," "decrease," or "unchanged" depends on various factors such as the actual implementation environment, system performance, capacity, operation purpose, and the like. In a particular embodiment, the following algorithm is presented to show how the above features may be applied an implemented.

First, a parameter BS_RCV (Base Station Rate Control Value) is defined to determine the total number of mobiles. Here, for the BS_RCV, the lowest MS_RCV value of the MS_RCV values (calculated at a base station or reported from a mobile) at a data rate of 9600 bps is set as its initial value. Thus, the BS_RCV is defined to limit the selective range of the MS_RCV such that only those mobiles having an MS_RCV value being above or below a certain level receive RCB increase or decrease data rate control information.

Figure 8:
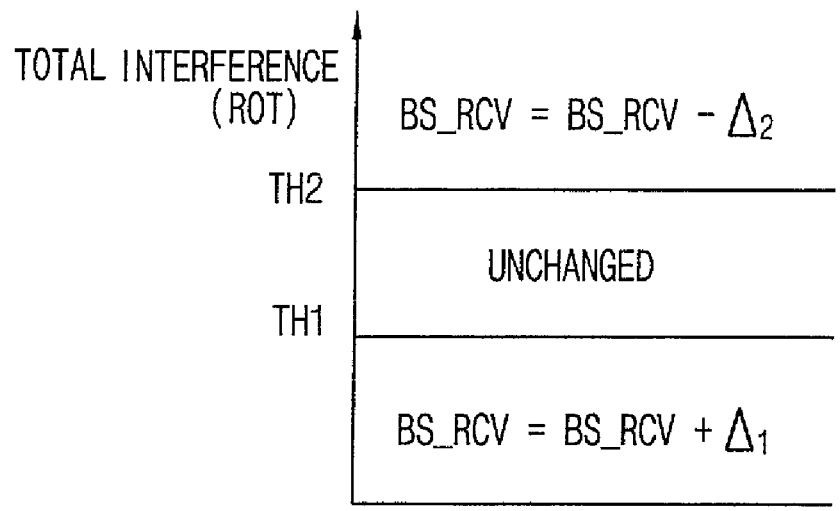
FIG. 8 shows the updating procedure of the BS_RCV according to the present invention.

FIG. 8 shows the updating procedure of the BS_RCV according to the present invention. The base station determines the total interference amount (i.e., ROT) received by the base station in the unit of time having a particular period. The base station then uses the detected ROT value to update the BS_RCV. If the detected ROT value is below ROT_TH1, BS_RCV increases by $\Delta_1$, and if the ROT value is below ROT_TH2, BS_RCV decreases by $\Delta_2$. However, if the ROT is maintained within a range between ROT_TH1 and ROT_TH2, the BS_RCV value is maintained at its previous value.

Figure 9:
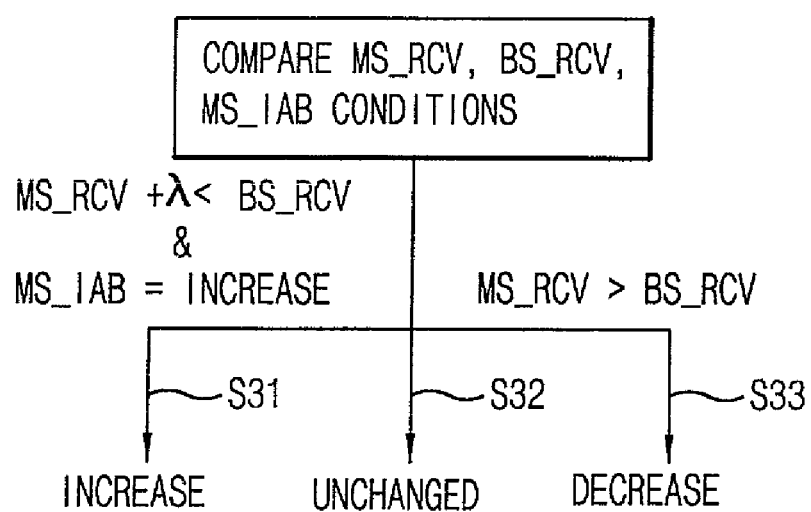
FIG. 9 shows the procedures for generating rate control information using the BS_RCV values according to the present invention.

FIG. 9 shows the procedures for generating rate control information using the BS_RCV values according to the present invention. First, the base station updates the BS_RCV value using the detected ROT value as shown in FIG. 8.

Then, the base station generates an RCB for each mobiles based on the following conditions using the MS_RCV value, the BS_RCV value, and the MS_IAB value received from the respective mobile. If (MS_RCV+$\lambda$)<BS_RCV, and MS_IAB="increase" are satisfied, the RCB is set as "increase." But, if MS_RCV>BS_RCV, then RCB is set as "decrease." However, if (MS_RCV+$\lambda$) <BS_RCV and MS_IAB "increase," or if MS_RCV BS_RCV (MS_RCV+$\lambda$), the RCB is set as "unchanged." As such, the present invention employs the "$\lambda$" value to more appropriately control the RCB value setting allocation to better reflect the communications environment.

FIG. 10 shows an example of how the reverse link data rate is controlled using the BS_RCV values according to the present invention. Namely, the steps for controlling the data rate of a mobile by the base station in an exclusive or dedicated manner are shown.

The base station updates the MS_PRI value by receiving a MS_PRI value from the mobile reported therefrom periodically, or whenever the channel conditions of the mobile change, or by directly calculating a MS_PRI value at the base station itself. The MS PRI value is initially set as 0 and updated thereafter (S100).

The base station uses the MS_PRI value and the data rate used by the mobile for transmission (i.e., the "Current_Assigned_Data_Rate") to calculate and manage the MS_RCV values of all mobiles being in active state with respect to the base station (S102).

The base station determines the total energy of the signals received thereof (i.e. the total interference amount, such as ROT) for each time interval having a certain period (S104).

Then, the base station updates the BS_RCV values using the method shown previously in FIG. 8 (S106). Thereafter, each mobile, for each frame, transmits the MS_IAB value to the base station (S108).

The base station then generates rate control bit (RCB) for controlling the data rate of each mobile using the MS_RCV, MS_IAB, and BS_RCV values (S110), and the RCB values are transmitted to each mobile (S112).

A respective mobile receives RCB values from all active base stations (S114), and generates a Combined RCB from the received RCB values for controlling the data rate of the next frame accordingly (S116). A method for combining the RCB values received from all active base stations is as follows:

If all received RCB values are set as "increase," the combined RCB is set as "increase." If any one of the RCB values is set as "decrease," the combined RCB is set as "decrease." In all other situations, the combined RCB is set as "unchanged."

In other words, a method for controlling a data transmission rate on a reverse link according to the present invention can comprise the steps of determining a channel condition value of each mobile station by a pilot channel average power level and a data transmission rate; comparing the channel condition value with a transmission threshold of a base station calculated by an interference at the base station; and adjusting a data transmission rate for each mobile station based upon the comparison result sent via a channel on a forward link to each mobile station in a dedicated manner.

Additionally, a method for controlling a data transmission rate on a reverse link according to the present invention can comprise the steps of determining a total interference level of signals received from one or more mobile stations; determining a data transmission control threshold value according to the total interference level; determining a transmission condition value by receiving a reverse link data transmission rate and a transmitted pilot signal strength from the one or more mobile stations; generating reverse link data transmission rate commands by comparing the transmission condition value with the data transmission control threshold value; and transmitting data to each mobile station in accordance with the generated reverse link data transmission rate commands.

Furthermore, a method for controlling a data transmission rate on a reverse link according to the present invention can comprise the steps of determining a total interference level of signals received at a base station; receiving a transmission pilot signal strength and a reverse link data transmission rate from a mobile station; and generating and sending to the mobile station, a reverse link data transmission rate command using the total interference level, the transmission pilot signal strength, and the a reverse link data transmission rate.

As described above, in accordance with the present invention, the data rate control information is generated by considering not only the total interference amount received by the base station, but also the signal reception conditions at each mobile. Thus, exclusive or dedicated data rate control for each mobile is possible. Accordingly, improved data transmissions being more appropriate to the channel conditions of each mobile is achieved, and data throughput is significantly gained. Also, base station management is advantageously improved, as the base station can accurately control the loading on the reverse link.

The present invention has been described above with respect to variations in data transmission techniques between a base station and mobile station served by the base station, focusing on transmissions on the reverse link in a next generation CDMA system. However, it will be understood that the invention can be advantageously applied to other situations including transmissions on other types of channels and other mobile communication systems being developed for handling data packet transmissions.

This specification describes various illustrative embodiments of a method and device of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

What is claimed is:

1. A method for controlling a data transmission rate on a reverse link in a mobile communications system including a plurality of base stations and a plurality of mobile stations, the method comprising:
    determining at a base station a data rate control command for controlling a transmission data rate of each mobile station to consider a channel condition or state of each mobile station;
    sending each data rate control command via a forward common channel in a dedicated manner to the mobile stations, the data rate control command being formed of at least one rate control bit that is signal point mapped to at least one symbol of +1, −1, and 0 to indicate whether the mobile station should increase, decrease, or maintain its current data transmission rate; and
    allowing each mobile station to adjust or maintain its data transmission rate based on the data rate control command, wherein a bit received from the mobile station on a reverse packet data control channel indicates whether the mobile station has enough power and data to increase its data transmission rate on a reverse packet data channel.

2. The method of claim 1, wherein determining the data rate control command is based on an interference level and a transmission condition of each mobile station.

3. The method of claim 2, wherein the interference level is determined based on the signals received from each mobile station.

4. The method of claim 2, wherein the transmission condition is based on a currently assigned data transmission rate.

5. The method of claim 1, wherein determining the data rate control command is based on a status of each mobile station.

6. The method of claim 1, wherein if a current data transmission rate of a particular mobile station is to be maintained, the rate control bit for the particular mobile station is mapped to a symbol of 0.

7. The method of claim 1, wherein the data rate control command is inserted into certain bit positions in a channel slot of the common channel.

8. The method of claim 7, wherein the certain bit position is determined based on a relative offset of a first bit position of the channel slot.

9. The method of claim 1, wherein determining the data rate control command is based on an interference level related to a rise over thermal (ROT) parameter.

10. The method of claim 1, wherein determining the data rate control command further includes determining a transmission condition of each mobile station based upon a cell interference probability of each mobile station.

11. The method of claim 10, wherein the base station receives the cell interference probability reported from each mobile station or calculates the cell interference probability by itself.

12. The method of claim 1, wherein determining the data rate control command further includes calculating a transmission condition of each mobile station using the cell interference probability applied to the energy required for a data rate for a current transmission frame for each mobile station.

13. The method of claim 1, wherein each mobile station transmits to the base station data rate information indicating whether the mobile station can transmit data in a next frame by increasing its data rate, and the data rate information is used when determining the data rate control command indicating how a current data transmission rate of a respective mobile station is to be adjusted.

14. The method of claim 13, wherein the data rate information is set as "increase" if a remaining transmission power of each mobile station is above a threshold and if the data rate of a current transmission is below a maximum data rate; otherwise, the data rate information is set as "unchanged".

15. The method of claim 1, wherein the data rate control command is determined based on data rate information indicating whether the mobile station can transmit in a next frame by increasing its data rate.

16. The method of claim 15, wherein the data rate control command is set as "increase" when a data rate information is set as "increase".

17. The method of claim 13, wherein the data rate information is set as "increase" or "unchanged" based on at least one of a remaining power, a current transmission rate, and a number of bits within a transmission buffer of each mobile station.

18. The method of claim 1, wherein the mobile station uses a bit that is sent on a reverse packet data control channel to indicate whether it has enough power and data to increase its data transmission rate on a reverse packet data channel.

19. The method of claim 18, wherein the bit is set as "1" if the mobile station has sufficient data and power headroom to transmit at a rate corresponding to a traffic-to-pilot ratio that is greater than a current authorized traffic-to-power ratio; otherwise, the bit is set as "0".

20. The method of claim 1, wherein a data rate control command is generated in accordance with an interference level, a transmission energy level, and the data rate information.

21. The method of claim 1, wherein the determining at the base station comprises:
    obtaining a total interference level of signals received from mobile stations served by the base station,
    obtaining a data transmission control threshold value according to the total interference level,
    obtaining a transmission condition value using a data transmission rate used by the mobile station for transmission and a pilot signal power value reported from the mobile stations, and
    generating a rate control command by comparing the transmission condition value with the data transmission control threshold value.

22. The method of claim 21, wherein the data transmission control threshold value is either maintained if the total interference level is within a fixed range, or the data transmission threshold is increased if the total interference level is less than the fixed range, or the data transmission threshold is decreased if the total interference level is greater than the fixed range.

23. The method of claim 21, wherein during the comparison of the transmission condition value with the data transmission control threshold value,
a data rate control parameter is set as "decrease" if the transmission condition value is greater than the data transmission control threshold value,
the data rate control parameter is set as "increase" if the transmission condition value is smaller than twice the data transmission control threshold value, and
otherwise the data rate control parameter is set as "maintain".

24. A base station apparatus for controlling a data transmission rate on a reverse link in a mobile communications system including a plurality of mobile stations, the apparatus comprising:
determining means adapted to determine a data rate control command for controlling a transmission data rate of each mobile station to consider a channel condition or state of each mobile station; and
a transceiver connected with the determining means adapted to send each data rate control command via a forward common channel in a dedicated manner to the mobile stations,
wherein the data rate control command being formed of at least one rate control bit that is signal point mapped to at least one symbol of +1, −1, and 0 to indicate whether the mobile station should increase, decrease, or maintain its current data transmission rate, wherein the transceiver receives a bit from the mobile station on a reverse packet data control channel indicating whether the mobile station has enough power and data to increase its data transmission rate on a reverse packet data channel.

25. The apparatus of claim 24, wherein the determining means is adapted to determine the data rate control command based on an interference level based on signals received from each mobile station and a transmission condition of each mobile station.

26. The apparatus of claim 24, wherein the data rate control command is based on a status of each mobile station.

27. The apparatus of claim 24, wherein if the current data transmission rate of a particular mobile station is to be maintained, then the rate control bit for the particular mobile station is mapped to a symbol of 0.

28. The apparatus of claim 24, further comprising means adapted to map the data rate control command to at least one symbol of +1, −1, and 0.

29. The apparatus of claim 24, further comprising means adapted to insert the data rate control command into certain bit positions in a channel slot of the common channel.

30. The apparatus of claim 29, wherein the inserting means is adapted to determine the certain bit position based on a relative offset of a first bit position of the channel slot.

31. The apparatus of claim 24, wherein the determining means is adapted to determine the data rate control command based on data rate information indicating whether the mobile station can transmit data in a next frame by increasing its data rate.

32. The apparatus of claim 24, wherein the determining means is adapted to determine an interference level based on a rise over thermal (ROT) parameter.

33. The apparatus of claim 24, wherein the determining means is adapted to determine a transmission condition based on a currently assigned data transmission rate of each mobile station.

34. A mobile station apparatus for use in a mobile communications system for controlling a data transmission rate on a reverse link, the apparatus comprising:
receiving means adapted to receive a data rate control command of a base station on a forward link common channel in a dedicated manner, the data rate control command being formed of at least one rate control bit that is signal point mapped to at least one symbol of +1, −1, and 0 to indicate whether the mobile station should increase, decrease, or maintain its current data transmission rate; and
control means connected with the receiving means adapted to control the data transmission rate based on the data rate control command, wherein a bit is sent on a reverse packet data control channel to indicate whether the mobile station has enough power and data to increase its data transmission rate on a reverse packet data channel.

35. The apparatus of claim 34, wherein the control means is adapted to determine data rate information as "increase" or "unchanged" to indicate how the mobile station should transmit data in a next frame to the base station.

36. The apparatus of claim 35, wherein the control means is adapted to determine the data rate information based on at least one of a remaining power, a current transmission data rate, and a number of bits within a transmission buffer of each mobile station.

37. A method of controlling a data transmission rate on a reverse link received by a mobile station apparatus for use in a mobile communications system, the method comprising:
receiving a data rate control command of a base station on a forward link common channel in a dedicated manner, the data rate control command being formed of a least one rate control bit that is signal point mapped to at least one symbol of +1, −1, and 0 to indicate whether the mobile station should increase, decrease, or maintain its current data transmission rate; and
controlling the data transmission rate based on the data rate control command rate, wherein a bit is sent on a reverse packet data control channel to indicate whether the mobile station has enough power and data to increase its data transmission rate on a reverse packet data channel.

38. The method of claim 37, further comprising determining the data rate information as "increase" or unchanged" to indicate how the mobile station should transmit valid data in the next frame to the base station.

39. The method of claim 38, wherein determining the data rate information is based on at least one of a remaining power, a current tranmission data rate, and a number of bits within a transmission buffer of each mobile station.

40. The method of claim 37, wherein the data rate information is set as "increase" if a remaining transmission power of the mobile station is above a threshold and if the data rate of a current transmission is below a maximum data rate; otherwise, the data rate information is set as "unchanged".

* * * * *